US007005463B2

(12) United States Patent
Taguchi et al.

(10) Patent No.: US 7,005,463 B2
(45) Date of Patent: Feb. 28, 2006

(54) CEMENT BONDED WOOD CHIP PRODUCT, RESIN BONDED WOOD CHIP PRODUCT, SIMULATED WOOD PRODUCT

(75) Inventors: Hidenori Taguchi, Suginami-ku (JP); Keishiro Umemura, Suginami-ku (JP)

(73) Assignee: Misawa Homes Co., Ltd., Tokyo (JP)

( * ) Notice: Subject to any disclaimer, the term of this patent is extended or adjusted under 35 U.S.C. 154(b) by 419 days.

(21) Appl. No.: 09/799,560

(22) Filed: Mar. 7, 2001

(65) Prior Publication Data

US 2001/0009309 A1 Jul. 26, 2001

Related U.S. Application Data

(62) Division of application No. 09/288,855, filed on Apr. 9, 1999, now Pat. No. 6,228,301.

(51) Int. Cl.
*C08K 3/00* (2006.01)

(52) U.S. Cl. .............................................. 524/9; 524/13

(58) Field of Classification Search ..................... 524/9, 524/13, 14
See application file for complete search history.

(56) References Cited

FOREIGN PATENT DOCUMENTS

JP 8-290409 11/1996

*Primary Examiner*—Edward J. Cain
(74) *Attorney, Agent, or Firm*—Oblon, Spivak, McClelland, Maier & Neustadt, P.C.

(57) ABSTRACT

A simulated wood product is molded by either extrusion or injection molding. This product has pulverized powders obtained from recycled building members. These members include recycled wooden members made of wooden materials and recycled resinous members also made of wooden materials. The pulverized powders include recycled wooden members and recycled resinous members in a mixed state by mixing and pulverizing the recycled wooden members and recycled resinous members together.

4 Claims, 2 Drawing Sheets

CEMENT BONDED WOOD CHIP PRODUCT, RESIN BONDED WOOD CHIP PRODUCT, SIMULATED WOOD PRODUCT

This application is a Division of application Ser. No. 09/288,855 Filed on Apr. 9, 1999 now U.S. Pat. No. 6,228,301.

BACKGROUND OF THE INVENTION

1. Field of the Invention

The present invention relates to a cement bonded wood chip product, a resin bonded wood chip product, a simulated wood product and manufacturing methods thereof utilizing as raw material pulverized powders obtained from recycled building members.

2. Description of Related Art

Conventionally, a simulated wood product resembling natural wood in many aspects including touch-feeling, has been manufactured by mixing pulverized powders obtained from pulverized cellulose materials with resin and the like which are then molded into desired shape by extrusion or injection molding. The above mentioned cellulose materials have been obtained from remains or sawdust of wooden materials used in the building industry. However, it has become very desirable from the standpoint of effective use of resources and environmental protection, to reuse once used building boards and the like as raw material by pulverizing them.

FIG. 2 is an illustration showing outline of a conventional method of manufacturing a simulated wood product utilizing recycled building members as raw material.

In the conventional method of manufacturing a simulated wood molding, components used for a building structure have been collected by separating them into recycled wooden members made of wooden materials and recycled resinous members made of resinous materials when a building is to be renewed. Separation work may be conducted manually or by a process which makes use of the differences in the specific gravity of materials, for instance, by way of floating the materials in a liquid. Recycled wood members and recycled resinous members are then processed on separate production lines up to a weighing process.

More specifically, all recycled wooden members are first crushed in a crushing process by a hammer mill and the like.

Next, at a weighing process, crushed wooden members are weighed to be a predetermined weight.

On the other hand, recycled resinous members are crushed by a hammer mill and the like in a crushing line different from that of the wooden members.

Next, at the pellet manufacturing process, resinous members, which have been crushed in the crushing process, are melted and the melted material is then molded into pellets by extrusion. The resinous member is crushed before the melting process because it is inconvenient to have the members in their original recycled forms in the melting process and also in order to improve the efficiency of the melting operation. Further, the reason for making the pellets is because it is advantageous for facilitating a dehydration process which is necessary prior to the molding since pellets absorb less moisture than in the originally crushed form. It is also more easily manageable as it does not disperse in the air. The pellets are granulated into the form of a sphere, a cylinder or a prism with a side length equal to 2 mm to 5 mm.

Next, in a weighing process, the pellets obtained in the pellet manufacturing process are weighed to a predetermined value. Next, in a mixing and kneading process, the weighed recycled wooden members and weighed pellets of recycled crushed resinous members are mixed and kneaded to be blended evenly.

Next, in a molding process, a predetermined pressure is applied in a predetermined temperature to the resultant mixture from the mixture and kneading process and molded into desired shapes either by extrusion or injection by means of a molding machine.

Through this process, a product with a proper ratio of wooden members and resinous members can be obtained.

Furthermore, in the above mentioned conventional manufacturing method, only predetermined weight is respectively measured to keep a definite mixing ratio of recycled wooden members and recycled resinous members in each of the weighing process. In other words, when materials of 200 kg are to be produced with a 1 to 1 weight-mixing ratio of the both members, 100 kg of recycled wooden members and 100 kg of recycled resinous members have to be weighed at each weighing process. Subsequently, both members are dispensed into a mixing mill and the like and kneaded together.

However, the above mentioned conventional method of manufacturing a simulated wood product has posed a first problem that, since the recycled wooden members and recycled resinous members had to be processed on independent production lines up to a weighing process and then mixed together, two similar lines are needed and further double space for installing the processing line as well as the number of machinery, such as pulverizing machines and the like, are required. And, in addition, more supervisors have to be provided for each production line, giving rise to more amount of labor.

Moreover, it posed a second problem that when one single pulverizing machine is used and the pulverizing process of recycled wooden members and recycled resinous member are executed by staggering the pulverizing time, time required for the pulverization will be doubled, necessitating cleaning operations at the time of switching over of the operations, which results in decrease in efficiency of the operation.

Furthermore, in the weighing process of the conventional manufacturing process, only the recycled wooden members and recycled resinous members have been weighed respectively in order to keep the mixing ratio constant. However, a mixing machine, such as a mixing mill, does not have a fixed weight but the permissible weight has a certain range which makes it unnecessary to limit the weight to a specific value if it is kept within this range. It is thus possible to obtain a uniform mixture when mixture ratio of recycled wooden members and recycled resinous members can be set at a certain value. Consequently, the conventional weighing process posed a third problem that it is necessary to weigh both of the members to a predetermined weight which necessitates more labor.

SUMMARY OF THE INVENTION

An object of the present invention has been made to solve the first and second problem of the prior art and to provide a manufacturing method of a simulated wood product, in which, by means of pulverizing recycled wooden members and recycled resinous members after they have been mixed, a mixing process and a pulverizing process can be incorporated into one line, reducing space as well as work in a plant, and improving production efficiency.

According to the first aspect of the present invention, the method of manufacturing a simulated wood product utilizing as raw material pulverized powders obtained from recycled building members uses the building members including recycled wooden members made of wooden materials and recycled resinous members made of resinous materials. The method is characterized in having; a mixing process for mixing the recycled wooden members and resinous members; a pulverizing process for producing pulverized powder by pulverizing the mixture obtained in the mixing process; a kneading process for kneading the pulverized powder obtained in the pulverizing process; and a molding process for molding the kneaded product obtained in the kneading process by either extrusion or injection molding.

Since the present invention pulverizes recycled wooden members and recycled resinous members after they have been mixed, installation of exclusive lines for both of the recycled wooden members and recycled resinous members is unnecessary, enabling to form a single line from the mixing process to the molding process. Accordingly, when compared with a case where installation of exclusive lines for both of the recycled wooden members and recycled resinous members is necessary, reduction in space for installing the process line as well as the number of employed machinery, such as a pulverizing machine, can be achieved in the plant. Further, number of workers involved in supervising each process line can be reduced, thereby cutting down the production cost. Furthermore, as compared with a case where a single machine is employed and recycled wooden members and recycled resinous members are pulverized by staggering process cycle, the time required for the processes can be reduced, and moreover, cleaning work at the time of switching over of the processes for the recycled wooden members and the recycled resinous members can be eliminated, thereby improving the production efficiency.

Further, the invention has been made in consideration of the third problem inherent in the above-mentioned prior art. Another object of the present invention is to provide a manufacturing method in which the number of times for dispensing the content of a dispensing vessel is made to be a standard of the dispensing amount of recycled wooden members and resinous members in the mixing process whereby an apparatus for measuring the total weight can be eliminated, a predetermined mixing ratio can easily be obtained and the operation facilitated.

In the above arrangement, a dispensing amount of recycled wooden members and recycled resinous members in the mixing process may preferably be determined by the number of times for dispensing the content of a dispensing vessel of a predetermined volume which has been filled with the members according to the second aspect of the present invention.

The wording "dispensing amount of the recycled wooden members and recycled resinous members in the mixing process" means the amount of recycled wooden members and recycled resinous members which is to be dispensed into the mixing machine such as a mixing mill employed in the mixing process.

The wording "determined by the number of times for dispensing the content of a dispensing vessel" means, for instance, a case where a product with a total weight of about 1,000 kg is manufactured from the recycled wooden members and the recycled resinous members with the weight mixing ratio of 1 to 1 and if the bulk densities of the both members are proven to be about 1.0 by a sampling method, the manufacturing method includes a method where, for instance, a dispensing vessel of the volume 0.1 cubic meter is dispensed five times with the recycled wooden members and recycled resinous members, respectively. Moreover, when a plurality of samplings have been taken to prove by experience that the ratio of the bulk densities of the members is within a limit of the prescribed value and the variances in the bulk density are within the permissible range of the mixed weight ratio of the members, number of times for dispensing may be determined without taking sampling of each member every time.

The present invention determines the dispensing amount of the recycled wooden members and recycled resinous members by the number of times for dispensing the content of the dispensing vessel with a predetermined volume. For this reason, weighing of the total volume of the dispensing amount becomes unnecessary, and a measuring apparatus for weighing the total dispensing amount is not required, enabling to determine the dispensing amount of the both members in accordance with the dispensing operation of the both members. Weighing operations other than the dispensing operations thus becomes unnecessary, so that working operation can be simplified.

Further object of the present invention is to provide a simulated wood product, wherein, by means of pulverizing recycled wooden members and recycled resinous members after they have been mixed, the mixing process and pulverizing process can be incorporated into one line, reducing space and as well as work in the plant and improving production efficiency.

The third aspect of the present invention is a simulated wood product produced by molding pulverized powders obtained from recycled building members by either extrusion or injection molding is provided, in which the building members comprise recycled wooden members made of wooden materials and recycled resinous members made of resinous materials, the pulverized powders comprising recycled wooden members and recycled resinous members in a mixed state by pulverizing together recycled wooden members and recycled resinous members.

The third aspect of the present invention is a product obtained by the first aspect of the present invention.

Since the simulated wood product according to the present invention utilizes as raw material pulverized powders produced by pulverizing a mixture of recycled wooden members and recycled resinous members, exclusive production lines for the respective recycled wooden members and recycled resinous members become unnecessary, enabling the production by a single line. Moreover, since process lines can be reduced, the number of process lines can be reduced as compared with installing exclusive lines for each member, reducing installation space for the process line in the plant and the number of employed machinery such as pulverizing machine as well as the number of workers involved in supervising each process line, which results in cutting down the production cost.

Still further object of the present invention is to provide a simulated wooden product, in which, by means of pulverizing recycled wooden members and recycled resinous members after they have been mixed, the mixing process and pulverizing process can be incorporated into one line, reducing space as well as work in the plant and, in addition to an improved production and molding efficiency, grain patterns of natural wood can be produced, whereby a simulated wood product excellent in outer appearance can be provided.

According to fourth aspect of the present invention, a simulated wood product is molded by either extrusion or injection molding, the simulated wood product comprising pulverized powders obtained from recycled building members. The simulated wood product is characterized in that impalpable powders smaller in size and harder than the pulverized powders to produce fixed particles are affixed onto the outer circumferential surfaces of the pulverized powders, a resin and a pigment are mixed with the fixed particles and a resultant mixture is molded into a simulated wood product by either extrusion or injection molding to exhibit a pattern similar to the grain of natural wood, the building members include recycled wooden members made of wooden materials and recycled resinous members made of wooden materials, and that the pulverized powders include recycled wooden members and recycled resinous members in a mixed state by mixing and pulverizing the recycled wooden members and recycled resinous members together.

Since a simulated wood product according to the present invention utilizes pulverized powders produced from pulverizing a mixture of recycled wooden members and recycled resinous members as raw material, exclusive production lines for both the recycled wooden members and recycled resinous members are not required, enabling to be incorporated into one production line. Moreover, since process lines can be reduced, the number of process lines can be reduced as compared with installing exclusive lines for each member, reducing installation space for the process line in the plant and the number of employed machinery such as pulverizing machine as well as the number of workers involved in supervising each process line, which results in cutting down the production cost.

Further, since the simulated wood product is made from the above-described materials, it is possible to provide patterns of natural wood grains on the surface of the simulated wood product. Moreover, though a natural wood product has a variance in the quality due to the difference in the kinds of woods used as raw material and the amount of the moisture content, the simulated wood product, which is made of the above described materials, is feasible to control the variance in the products. In other words, since products molded with above mentioned materials can exhibit natural wood grain patterns even with complicated sectional forms, they are well suited for application to building members to decorate the surfaces of the interior of a building. To put it another way, it is possible to provide a product with a natural wood grain pattern having configuration into which a natural wood would prove to be too laborious for cutting and processing.

Further, since the fixed particles are formed from pulverized powders and the fixed particles are mixed with a resin, it absorbs less water than ordinary wood products, thereby facilitating the maintenance operation. In other words, it is possible to provide a simulated wood product which not only exhibit a natural wooden pattern but also can provide much superior quality with respect to water resistance.

The resin includes rigid resin and soft resin, such as vinyl chloride resin, expanded vinyl chloride, polyethylene resin, polypropylene resin, phenol resin, urethane resin, polyurethane resin, ABS resin and polystyrene resin and so on.

The pulverized particles smaller in size and harder than pulverized powders include impalpable powders of titanium oxide, ferrite, aluminum, nickel, silver, ceramic, calcium carbonate and so on.

The pigments refer to colored pigments, including inorganic pigments such as iron oxide, cadmium yellow, carbon black.

Still further object of the present invention is to provide a cement bonded wood chip product, in which, by means of pulverizing recycled wooden members and recycled resinous members after they have been mixed, the mixing process and pulverizing process can be incorporated into one line, reducing space as well as work in the plant and improving production efficiency.

According to fifth aspect of the present invention, a cement bonded wood chip product is molded by compression molding, the cement bonded wood chip product comprising a mixture of pulverized powders obtained from recycled building members and cement. The cement bonded wood chip product is characterized in that the building members include recycled wooden members made of wooden materials and recycled resinous members made of resinous materials, and that the pulverized powders include recycled wooden members and recycled resinous members in a mixed state by mixing and grinding the recycled wooden members and recycled resinous members together.

Since the cement bonded wooden chip product according to the present invention utilizes pulverized powders produced from pulverizing a mixture of recycled wooden members and recycled resinous members as raw material, exclusive production lines for the respective recycled wooden members and recycled resinous members become unnecessary, enabling the production by a single line. Moreover, since process lines can be reduced, installation space for the process line in the plant, the number of employed machinery such as pulverizing machine as well as the number of workers involved in supervising each process line can be reduced as compared with installing exclusive lines for each member, which results in cutting down the production cost.

Still further object of the present invention is to provide a resin bonded wood chip product, in which, by means of pulverizing recycled wooden members and recycled resinous members after they have been mixed, the mixing process and pulverizing process can be incorporated into one line, reducing space as well as work in the plant and improving production efficiency.

According to sixth aspect of the present invention, a resin bonded wood chip product includes pulverized powders obtained by pulverizing recycled building members and adhesive. The resin bonded wood chip product is characterized in that the pulverized powders is mixed with the adhesive and a resultant mixture is molded by thermocompression molding, the building members include recycled wooden members made of wooden materials and recycled resinous members made of resinous materials, and that the pulverized powder include recycled wooden members and recycled resinous members in a mixed state by mixing and grinding together the recycled wooden members and recycled resinous members.

The resin bonded wood chip product is a molding made by thermo-compression of a mixture of a bonding agent and pulverized powders obtained by pulverizing recycled building members, and other than the fact that such pulverized powders are utilized therein, it is similar to a conventional particle board of chip board and may be produced by a similar manufacturing method.

Since the bonded wood chip product according to the present invention utilizes pulverized powders produced from pulverizing a mixture of recycled wooden members and recycled resinous members as raw material, exclusive production lines for the respective recycled wooden members and recycled resinous members are unnecessary, enabling the production by a single line. Moreover, since process lines can be reduced, installation space for the process line in the plant, the number of employed machinery such as pulverizing machine as well as the number of workers involved in supervising each process line can be reduced as compared with installing exclusive lines for each member, which results in cutting down the production cost.

DETAILED DESCRIPTION OF PREFERRED EMBODIMENT(S)

Figure 1:
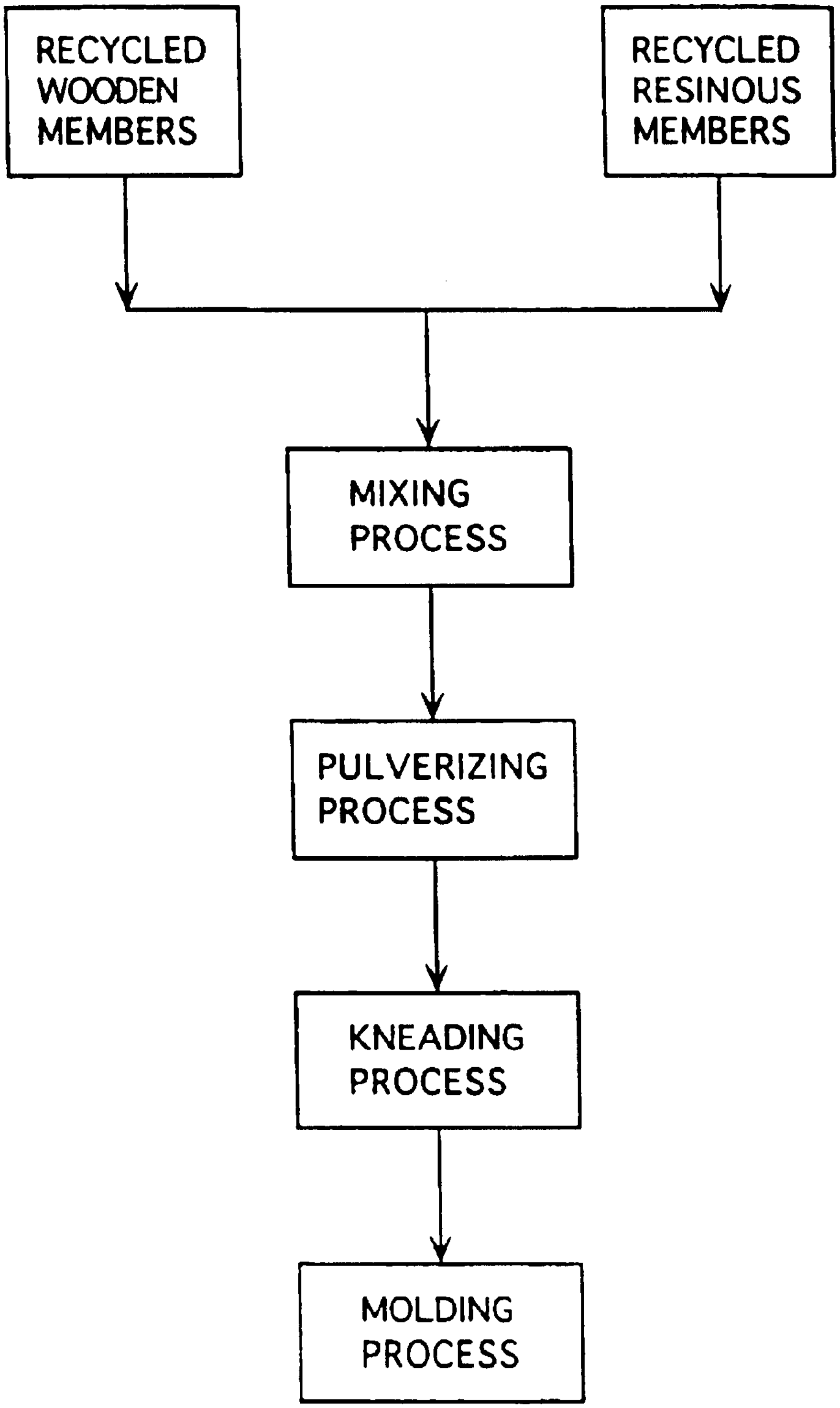
FIG. 1 is an illustration showing outline illustrating a manufacturing method of a simulated wood product according to first embodiment of the present invention.
Figure 2:
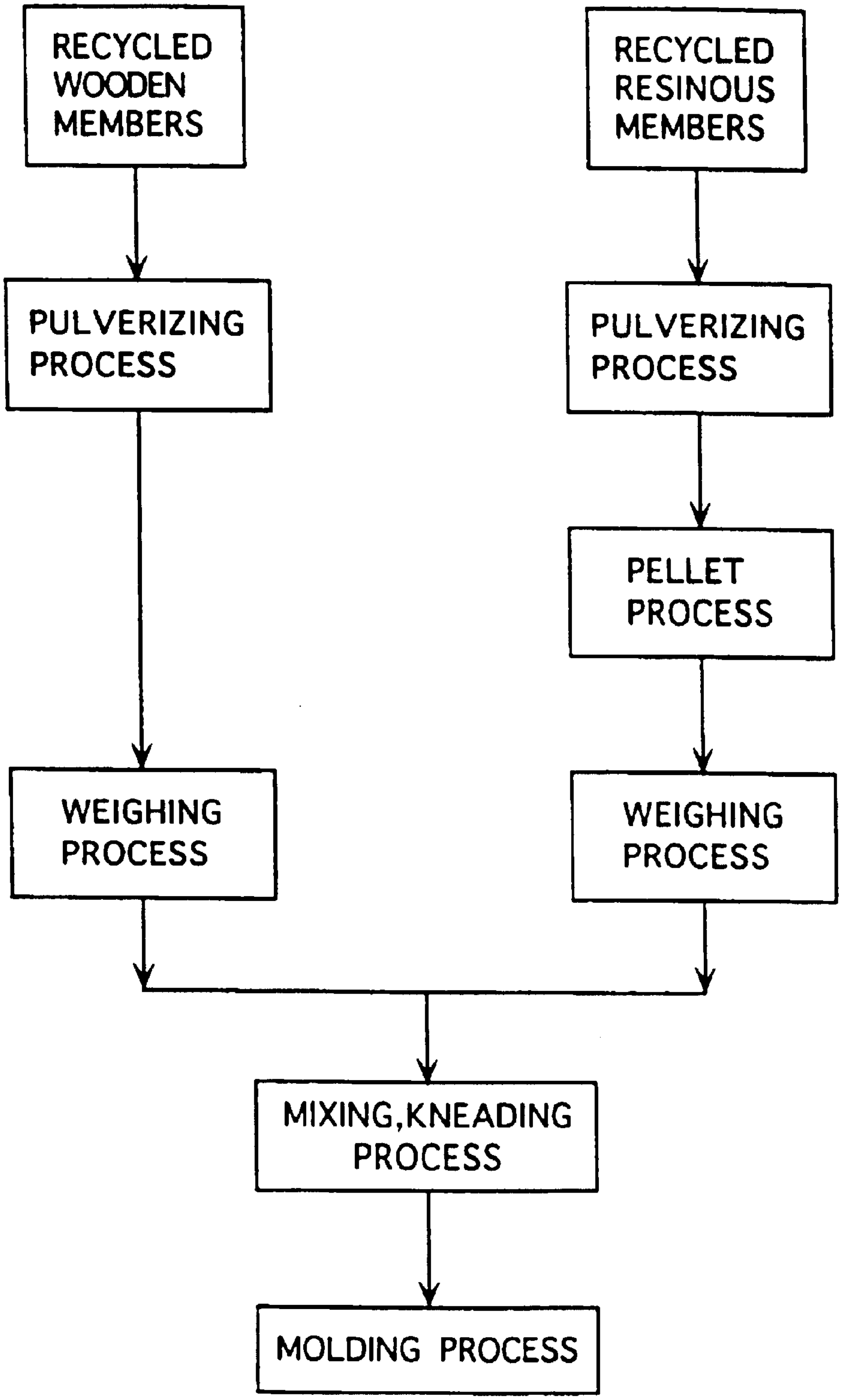
FIG. 2 PRIOR ART
FIG. 2 is an illustration showing outline illustrating a manufacturing method of a simulated wood product utilizing recycled building members as raw material according to conventional art.

Embodiments of the present invention will be described in further detail with reference to the drawings hereinafter:

FIG. 1 illustrates a first embodiment of the present invention and shows an illustration showing outline of a manufacturing method of a simulated wood product.

A simulated wooden product according to the present embodiment is a product produced by either extrusion or injection molding of pulverized powders obtained from recycled building members. Further, the building members comprise recycled wooden members made of wooden materials and recycled resinous members made of resinous materials. The pulverized powders constitute a form in which recycled wooden members and recycled resinous members exist in a mixed state by pulverizing together the recycled wooden members and recycled resinous members.

The manufacturing method of the simulated wood product of the present embodiment will be described next. First, building members which have been used in a building are recycled and separated into recycled wooden members made of wooden materials and recycled resinous members made of resinous materials at the time of renewing a building. Of course, building members to be recycled include not only deteriorated scrap wood from a dismantled building but also left over of materials at a construction site. This separation operation includes manual separation operation or mechanical separation operation utilizing the differences in the properties of each material. By the time this separation operation is completed the building members are in a state of separate lumps by the demolishing and dismantling work.

Next, in a mixing process, the lumps of recycled wooden members and recycled resinous members are dispensed into the inside of a mixer with a plurality of rotating blades at its center to be mixed therein. Other type of mixer, of course, can be used. In this case, the dispensing amount of the recycled wooden members and recycled resinous members is determined by the number of times for dispensing the content of a dispensing vessel which has a predetermined volume and has been filled with each member. It should be noted that the number of times for dispensing is derived from the bulk density of both members obtained by a plurality of samplings, weight ratio of the mixture and the volume of the dispensing vessel.

Next, in the pulverizing process the materials mixed in the mixing process are pulverized into pulverized powder. The pulverizing process is composed of three processes, namely, a first pulverizing (crushing) process, a second grinding process and a third pulverizing process. This pulverizing form, however, is separated into the groups only to effectively execute the operation and is not limited thereto, and may by all means be executed in one pulverizing process.

The crushing machine used in the first crushing process possesses a crushing function being capable of forming the materials into lumps of a few centimeters size and, more particularly, the crushing machine possesses numerous protrusions on the surfaces of a pair of opposing rollers and by passing through the materials under pressure through the rollers set in rotation, the materials are crushed to small lumps. Needless to say, the crushing machine is not limited to this particular type and any other crushing machine possessing a similar function may be used. For instance, a jaw crusher where materials are placed between an upwardly opened jaw in the shape of the letter V and a vibrating jaw and then crushed by application of a pressure, or such a machine like a gyratory crusher where, for instance, a movable crushing surface rotates within a fixed crushing surface and materials are continuously crushed, may also be employed.

At the second pulverizing process, materials which have been processed in the first crushing process are further processed. Pulverizing machine employed in the second pulverizing process pulverizes the lumps of materials into powders of less than a few millimeters in diameter, and more particularly, it utilizes a hammer mill where materials are crushed by hammer chips rotating at a high speed and crushing operation is continued till the materials pass through screening holes placed at the perimeter of the hammer chip. Needless to say, the pulverizing machine to be used here is not limited to the above mentioned hammer mill and other pulverizing machines possessing a similar function may also be used. For instance, a cutter mill where materials are dissected by means of a cutting blade, or a roller mill which crushes the materials and so on may be used.

At the third pulverizing process, materials which have been processed in the second pulverizing process are further pulverized. The pulverizing machine employed in the third pulverizing process is capable of pulverizing the materials obtained by the second pulverizing process to finer powdery particles. More particularly, the machine is a so-called pin mill which is capable of pulverizing the materials by impact and repulsion interaction of the pins mounted on a circular disc. More specifically, this pin mill comprises a rotating disc in the form of a circular disc having numerous pins in the vertical direction and a fixed disc having numerous pins opposing the rotating disc and when the materials obtained in the second pulverizing process are placed into the center part of the rotating disc, materials enter into gaps between the rotating disc and the pins mounted on the fixed disc by a centrifugal force whereby materials are pulverized into powdery particles by undergoing an interaction of impact and repulsion. At the third pulverizing process materials may be pulverized to the size of approximately 60 micron meter by the above mentioned pin mill. Needless to say, the pulverizing machine to be used here is not limited to the above mentioned pin mill and other pulverizing machines possessing a similar function, such as a ball mill or a stone mill may also be used.

In the above-mentioned pulverizing processes, recycled building members are pulverized effectively in three-stages. Though not expressly shown, the process is set such that the materials which already have the prescribed sizes of particles after being sieved are directly transferred to a storage of pulverized powders.

Next, at a kneading process, pulverized powders obtained in the pulverizing processes are kneaded to uniformly blend the pulverized powders of different materials. At this time, as necessary, various pigments or resinous powders other than the recycled powders may also be added and kneaded.

In the molding process a prescribed temperature and pressure are applied to the kneaded materials and then molded into desired shapes by extrusion or injection molding machines.

By doing so, a simulated wood product can be obtained utilizing recycled building members and the production process is thus completed.

As explained above, since the manufacturing method of the simulated wood product according to the present embodiment pulverizes the materials after mixing the recycled wooden members and recycled resinous members, exclusive production lines for both the recycled wooden members and recycled resinous members therefore become unnecessary and the production line can be incorporated into a single one from the mixing process to the molding process. Therefore, as compared with a case where an exclusive line has to be provided for each member, the space for installing a process line can be reduced as well as the number of employed machinery including pulverizing machines. Furthermore, supervisors for each process line can also be reduced so that the production cost can be cut down. Also, as compared with a case where only one machine is employed and the pulverizing process for the recycled wood members and recycled resinous members are executed at a staggered time, time required for the pulverizing processes can be reduced and cleaning operations at the time of switching over of the operations between the recycled wooden members and recycled resinous members become unnecessary, whereby operational efficiency can be improved.

Furthermore, dispensing amount of the recycled wooden members and recycled resinous members are determined by the number of times for dispensing the content of the dispensing vessel. For this reason, weighing of the total of the dispensing amount becomes unnecessary, and dispensing amount for both of the members can be determined according to the dispensing operations, not necessitating a measuring apparatus for measuring the total of the dispensing amount. Consequently, weighing operations other than the dispensing operations are not required and the pulverization process can be simplified.

It should be noted that in the above described manufacturing method of the simulated wood product the kneading process is preceded by the pulverization stages executed in the first, second and third pulverization process after the recycled wooden members and recycled resinous members have been mixed in the mixing process. However it is just as possible to let each member go through only the first pulverizing (crushing) process before mixing and then mixed to proceed to the second and third pulverizing processes which further lead to the next kneading process. By doing so, the sizes of the lumps of both members to be filled into the dispensing vessels can be made uniformly in the mixing process, enabling to uniformly and densely fill both members into the dispensing vessel, thereby improving substantially the degree of measuring accuracy of the dispensing vessel.

Next will be described a second embodiment.

A simulated wood product according to the present embodiment is characterized in that impalpable powders harder and smaller in size than the pulverized powders are affixed to the surface of pulverized powders obtained from pulverizing the recycled building members to obtain the fixed particles, and that resin and pigments are added to thus obtained fixed particles and this conglomerate is molded by either extrusion or injection molding to produce grain patterns similar to natural wood. Further, the building members, similar to the first embodiment, comprises recycled wooden member made of wood materials and resinous members made of resinous materials, in which the pulverized powders have been pulverized as a mixture of the recycled wood members and recycled resinous members comprising the recycled wood members and recycled resinous members in a mixed state. Further, simulated wood products according to the present embodiment may be obtained by the manufacturing process similar to the manufacturing process as described in the first embodiment.

Functions and effects of the above-described embodiment will be described below.

Simulated wood products according to the present embodiments, in addition to the functions and effects of the first embodiment, can produce grain patterns similar to natural wood on the outer surface thereof since the "simulated wood product" is composed of the above described materials. Moreover, whereas a natural wood product has a variance in the quality due to the differences in the kinds of woods used as raw material and the amount of the moisture content, the simulated wood product, which is made from the above described materials, is feasible to control the variance of the products. In other words, since products molded with above mentioned materials can exhibit natural wood grain patterns even with complicated sectional forms, they are well suited for application to members to decorate the surfaces of the interior of a building. To put it another way, it is possible to provide a product with a natural wood grain pattern having configuration into which a natural wood would prove to be too laborious for cutting and processing.

Since fixed particles are formed from the pulverized powders and a resin is mixed with the fixed particles, the material absorbs less moisture than an ordinary wooden material and maintenance is thereby facilitated. In other words, it is possible to provide a simulated wood product which not only resembles a natural wood by exhibiting wood grain pattern but also possesses a much higher water-resistant property.

Third embodiment will be described below.

Cement bonded wood chip product according to the present embodiment is produced, in which pulverized powders obtained from pulverizing recycled building members are mixed with cement and the resultant mixture is molded by pressure molding. Further, the building members, similar to the first embodiment, comprise recycled wooden members made of wooden materials and recycled resinous members made of resinous materials, the pulverized powders comprising the recycled wooden members and recycled resinous members in a mixed state by being pulverized as a mixture of the recycled wooden members and the recycled resinous members. Cement bonded wood chip product according to the present embodiment, can be produced by a similar manufacturing process as the manufacturing process described in the first embodiment.

Also in this embodiment, a cement bonded wood chip product having similar functions and effects as the first embodiment can be obtained.

Fourth embodiment will be explained next.

A resin bonded wood chip product according to the present embodiment is produced by mixing powders obtained from pulverizing recycled building members and a bonding agent, the resultant mixture is then molded by thermal pressure molding. Further, building members, similar to the first embodiment, comprise recycled wooden members made of wooden materials and recycled resinous members made of resinous materials, the pulverized powders comprising the recycled wooden members and recycled resinous members in a mixed state by being pulverized as a mixture of the recycled wooden members and the recycled resinous members. Further, resin bonded wood chip product according to the present embodiment, can be produced by a similar manufacturing process as the manufacturing process described in the first embodiment.

Also in the present embodiment resin bonded wood chip products having similar functions and effects as the first embodiment can be obtained.

What is claimed is:

1. A simulated wood product molded by either extrusion or injection molding, the simulated wood product comprising pulverized powders obtained from recycled building members, wherein said building members include recycled wooden members made of wooden materials and recycled resinous members made of resinous materials, and wherein said pulverized powders include recycled wooden members and recycled resinous members in a mixed state by mixing and pulverizing the recycled wooden members and recycled resinous members together to a size of approximately 60 micron meter.

2. A simulated wood product molded by either extrusion or injection molding, the simulated wood product comprising pulverized powders obtained from recycled building members, wherein impalpable powders smaller in size and harder than the pulverized powders to produce fixed particles are affixed onto the outer circumferential surfaces of said pulverized powders, wherein a resin and a pigment are mixed with the fixed particles and a resultant mixture is molded into a simulated wood product by either extrusion or injection molding to exhibit a pattern similar to the grain of natural wood, wherein said building members include recycled wooden members made of wooden materials and recycled resinous members made of resinous materials, and wherein said pulverized powders include recycled wooden members and recycled resinous members in a mixed state by mixing and pulverizing the recycled wooden members and recycled resinous members together.

3. A cement bonded wood chip product molded by compression molding, the cement bonded wood chip product comprising a mixture of pulverized powders obtained from recycled building members and cement, wherein said building members include recycled wooden members made of wooden materials and recycled resinous members made of resinous materials, and wherein said pulverized powders include recycled wooden members and recycled resinous members in a mixed state by mixing and grinding the recycled wooden members and recycled resinous members together.

4. A resin bonded wood chip product comprising pulverized powders obtained by pulverizing recycled building members and adhesive, wherein said pulverized powders are mixed with the adhesive and a resultant mixture is molded by thermo-compression molding, wherein said building members include recycled wooden members made of wooden materials and recycled resinous members made of resinous materials, and wherein said pulverized powders include recycled wooden members and recycled resinous members in a mixed state by mixing and grinding together the recycled wooden members and recycled resinous members.

* * * * *